United States Patent Office 2,983,752
Patented May 9, 1961

2,983,752

SYNTHESIS OF CANTHAXANTHIN AND RHODOXANTHIN

Rudolf Rüegg, Bottmingen, Switzerland, and Gabriel Saucy, Nutley, N.J., assignors to Hoffmann-La Roche Inc., Nutley, N.J., a corporation of New Jersey No Drawing. Filed Feb. 6, 1959, Ser. No. 791,528

Claims priority, application Switzerland Feb. 14, 1958

15 Claims. (Cl. 260—488)

This invention relates to an improved synthesis of canthaxanthin and rhodoxanthin.

More particularly, this invention relates to a simplified procedure for producing canthaxanthin and rhodoxanthin in high yield from 1,18-di-(2,6,6-trimethyl-2-cyclohexen-1-ylidene) - 3,7,12,16 - tetramethyl - 2,4,6,12,14,16 - octadecahexaen-9-yn-8,11-diol and 1,18 - di - (2,6,6-trimethyl-1,3-cyclohexadien-1-yl)-3,7,12,16 - tetramethyl - 1,3,5,13, 15,17-octadecahexaen-8,10-diyn-7,12-diol, respectively.

The overall process of this invention comprises reacting 1,18 - di - (2,6,6 - trimethyl - 2 - cyclohexen - 1 - ylidene)- 3,7,12,16 - tetramethyl - 2,4,6,12,14,16 - octadecahexaen-9-yn-8,11-diol or 1,18-di-(2,6,6-trimethyl-1,3-cyclohexadien-1-yl)-3,7,12,16-tetramethyl-1,3,5,13,15,17 - octadecahexaen-8,10-diyn-7,12-diol with a lower alkanoic acid, hydrolyzing the reaction product and then oxidizing with aluminum alkoxide and a keto selected from the group consisting of lower alkyl ketones, alicyclic ketones and aromatic ketones. During this sequence of steps, the one or two triple bonds of the starting material remain unchanged. In order to obtain canthaxanthin or rhodoxanthin instead of dehydrocanthaxanthin or bis-dehydrorhodoxanthin, respectively, the one or two triple bonds may be selectively hydrogenated to a double bond either after the reaction with the alkanoic acid, after the hydrolysis or after the oxidation step.

The initial reaction with the lower alkanoic acid and the oxidation with aluminum alkoxide and the ketone are the stages which contribute particularly to the simplicity of the overall process and the high yields obtained.

In the first step of the overall process the starting compound is reacted with a lower alkanoic acid, e.g., an acid of the fatty acid series, such as acetic acid, propionic acid, butyric acid, etc. The reaction may be effected at room temperature. By this treatment with the lower alkanoic acid, the starting compound undergoes an allyl rearrangement and at the same time is acylated so that the system of double bonds is rearranged and an acyloxy group is attached to each of the cyclic groups in the molecule.

The diester which is obtained from the initial step of the process described above is hydrolyzed by treatment with a base, for example an alkali metal hydroxide. It is preferable to treat the diester in an inert organic solvent, such as ether, with an alcoholic solution of the base, for example with a methanolic solution of potassium hydroxide.

The oxidation of the two hydroxy groups, which result from the hydrolysis step, to oxo groups is accomplished by means of aluminum alkoxide and the ketone, such as e.g. acetone, cyclohexanone and benzoquinone. Preferably, the aluminum alkoxide is an aluminum lower alkoxide, such as aluminum ethoxide, aluminum propoxide, aluminum isopropoxide, and the like. Aluminum isopropoxide and acetone are preferred. The reaction takes place at room temperature and is preferably carried out in an inert organic solvent, such as benzene. The conversion proceeds mildly and provides excellent yields of the desired oxidation product.

The one or two triple bonds in the compound may be selectively hydrogenated to a double bond either after the initial esterification step, after the hydrolysis or after the final oxidation step. Preferably, the reduction of the triple bond or bonds is effected by reduction with hydrogen in an inert solvent, e.g., a hydrocarbon solvent such as petroleum ether or the like, in the presence of a selective hydrogenation catalyst such as a lead-palladium catalyst in the presence of quinoline [Helv. Chim. Acta 35, 446 (1952)].

For the preparation of canthaxanthin, 1,18-di-(2,6,6-trimethyl - 2 - cyclohexen - 1 - ylidene) - 3,7,12,16 - tetramethyl-2,4,6,12,14,16-octadecahexaen-9-yn - 8,11 - diol is treated initially with a lower alkanoic acid, such as acetic acid, to obtain as a result of the allyl rearrangement and esterification, 1,18-di-(2,6,6-trimethyl - 3 - lower alkanoyloxy-1-cyclohexen-1-yl) - 3,7,12,16 - tetramethyl - 1,3,5,7, 11,13,15,17-octadecaoctaen-9-yne. The last named compound is converted by hydrolysis with a base to 1,18-di-(2,6,6-trimethyl-3-hydroxy-1-cyclohexen-1-yl) - 3,7,12,16-tetramethyl - 1,3,5,7,11,13,15,17 - octadecaoctaen - 9 - yne which in turn is oxidized by treatment with aluminum alkoxide and the ketone to 1,18-di-(2,6,6-trimethyl-3-oxo-1-cyclohexen-1-yl)-3,7,12,16 - tetramethyl - 1,3,5,7,11,13, 15,17-octadecaoctaen - 9 - yne (9,10 - dehydro-canthaxanthin). The dehydrocanthaxanthin may be selectively partially hydrogenated to canthaxanthin. Alternatively, the 1,18-di-(2,6,6-trimethyl-3-lower alkanoyloxy-1-cyclohexen-1-yl) - 3,7,12,16 - tetramethyl - 1,3,5,7,11,13,15,17-octadecanoctaen-9-yne may be selectively hydrogenated to obtain 1,18-di-(2,6,6-trimethyl-3-lower alkanoyloxy-1-cyclohexen-1-yl)-3,7,12,16 - tetramethyl - 1,3,5,7,9,11,13, 15,17-octadecanonaene which may be subjected to the same hydrolysis and oxidation steps to obtain 1,18-di-(2,6,6-trimethyl-3-hydroxy-1-cyclohexen-1-yl) - 3,7,12,16-tetramethyl - 1,3,5,7,9,11,13,15,17 - octadecanonaene and then canthaxanthin.

According to still another modification, the 1,18-di-(2,6,6-trimethyl-3-hydroxy-1-cyclohexen-1-yl) - 3,7,12,16-tetramethyl - 1,3,5,7,11,13,15,17 - octadecaoctaen - 9 - yne may be selectively hydrogenated to obtain 1,18-di-(2,6,6-trimethyl-3-hydroxy-1-cyclohexen-1-yl) - 3,7,12,16 - tetramethyl-1,3,5,7,9,11,13,15,17-octadecanonaene, which may be subjected to the oxidation step to obtain canthaxanthin.

For the preparation of rhodoxanthin, the reaction of a lower alkanoic acid with 1,18-di-(2,6,6,trimethyl-1,3-cyclohexadien-1-yl)-3,7,12,16 - tetramethyl - 1,3,5,13,15,17-octadecahexaen-8,10-diyn-7,12-diol effects allyl rearrangement and esterification of the latter to produce 1,18-di-(2,6,6-trimethyl - 4 - lower alkanoyloxy - 2 - cyclohexen-1-ylidene)-3,7,12,16-tetramethyl - 2,4,6,12,14,16 - octadecahexaen-8,10-diyne. The last named compound is hydrolyzed by means of a base to 1,18-di-(2,6,6-trimethyl-4-hydroxy-2 - cyclohexen - 1 - ylidene) - 3,7,12,16 - tetramethyl-2,4,6,12,14,16-octadecahexaen - 8,10 - diyne which is then oxidized by treatment with aluminum alkoxide and the ketone to 1,18-di-(2,6,6-trimethyl-4-oxo-2-cyclohexen-1-yliden) - 3,7,12,16 - tetramethyl - 2,4,6,12,14,16-octadecahexaen-8,10-diyne (8,9,10,11-dehydro-rhodoxanthin). The dehydro-rhodoxanthin may then be selectively partially hydrogenated to rhodoxanthin. Alternatively, the 1,18-di-(2,6,6-trimethyl-4-lower alkanoyloxy-2-cyclohexen-1-ylidene) - 3,7,12,16 - tetramethyl - 2,4,6,12,14,16-octadecahexaen-8,10-dyne may be selectively hydrogenated to obtain 1,18-di-(2,6,6-trimethyl-4-lower alkanoyloxy-2-cyclohexen-1-ylidene)-3,7,12,16-tetramethyl - 2,4,6, 8,10,12,14,16-octadecaoctaene which may be subjected to the same hydrolysis and oxidation steps to obtain 1,18-di-(2,6,6-trimethyl - 4 - hydroxy - 2 - cyclohexen-1- ylidene)-3,7,12,16-tetramethyl-2,4,6,8,10,12,14,16- - octadecaoctaene and then rhodoxanthin.

According to still a further modification, the 1,18-di-(2,6,6-trimethyl-4-hydroxy - 2 - cyclohexen - 1 - ylidene)-3,7,12,16 - tetramethyl - 2,4,6,12,14,16 - octadecahexaen-8,10-diyne may be selectively hydrogenated to obtain 1,18-di-(2,6,6 - trimethyl - 4 - hydroxy - 2 - cyclohexen - 1 - ylidene)-3,7,12,16-tetramethyl - 2,4,6,8,10,12,14,16 - octadecaoctaene, which may be subjected to the oxidation step to obtain rhodoxanthin.

The following examples are illustrative of the invention. All temperatures are stated in degrees centigrade.

Example 1

50 g. of 1,18 - di - (2,6,6-trimethyl-2-cyclohexen-1-ylidene)-3,7,12,16-tetramethyl-2,4,6,12,14,16 - octadecahexaen-9-yne-8,11-diol were reacted with 100 ml. of acetic acid by agitating for 6 hours at room temperature in a nitrogen atmosphere. A voluminous, orange colored precipitate resulted. The semi-fluid reaction mixture was dissolved in 1000 ml. of ether in the cold, diluted with 500 ml. of petroleum ether (boiling range 80–110°) and washed six times with 500 ml. portions of water. The wash water was placed in two separatory funnels and each portion was extracted with 250 ml. of petroleum ether. After drying over sodium sulfate, the extracts were combined and concentrated in vacuo at 50° to a volume of approximately 250 ml., then cooled to −30°. 1,18 - Di - (2,6,6-trimethyl-3-acetoxy-1-cyclohexen-1-yl)-3,7,12,16 - tetramethyl - 1,3,5,7,11,13,15,17 - octadecaoctaen-9-yne precipitated and was filtered under suction, washed several times with petroleum ether (boiling range 40–45°) and dried at 30° in vacuo. The product was recrystallized from ethyl acetate-methanol and petroleum ether (boiling range 80–110°) and showed a U.V. absorption maximum at 427–429 m$\mu$ (in petroleum ether).

57 g. of 1,18-di-(2,6,6-trimethyl-3-acetoxy-1-cyclohexen-1-yl) - 3,7,12,16-tetramethyl - 1,3,5,7,11,13,15,17-octadecaoctaen-9-yne were dissolved in two liters of ether and a small amount of undissolved material was filtered off. The solution was cooled in an ice bath to about 10°. A solution of 20 g. of potassium hydroxide in 120 ml. of methanol was added to the solution. The mixture was permitted to stand for 3 hours in an ice bath at about 5° under a nitrogen atmosphere, rotating the vessel frequently. To separate the alkali and the alcohol, the mixture was washed three times with 300 ml. portions of water and the wash water was extracted with 500 ml. of ether. The ether solutions were combined and dried over sodium sulfate. The solvent was then distilled off. The solid orange residue was dissolved while hot in 1200 ml. of benzene and permitted to crystallize in an ice bath. The crystals were filtered off, washed with benzene and then with a small amount of petroleum ether and dried in vacuo. The crystalline product, 1,18 - di - (2,6,6 - trimethyl-3-hydroxy-1-cyclohexen-1-yl) - 3,7,12,16 - tetramethyl - 1,3,5,7,11,13,15,17-octadecaoctaen-9-yne, showed a U.V. absorption maximum at 430 m$\mu$ (in petroleum ether).

28 g. of 1,18 - di - (2,6,6-trimethyl-3-hydroxy-1-cyclohexen-1-yl) - 3,7,12,16 - tetramethyl - 1,3,5,7,11,13,15,17-octadecaoctaen-9-yne were dissolved in 1 liter of benzene, 60 g. of benzoquinone and 60 g. of aluminum isopropoxide were added and the mixture was agitated under a nitrogen atmosphere for about 8 to 10 hours. The precipitated material was filtered off and the filtrate was washed with 500 ml. of methylene chloride, then evaporated to dryness in vacuo. The residue was dissolved in 200 ml. of methylene chloride and filtered. 200 ml. of alcohol were addde to the filtrate and the solvent was distilled until crystallization began. The mixture was cooled in an ice bath to about 2° and the precipitated crystalline mass was filtered off, washed with alcohol and petroleum ether. The petroleum-methylene chloride mother liquor was concentrated to approximately 70 ml., whereupon after several hours standing in the ice bath, a second precipitate was formed which was filtered again and washed with alcohol and petroleum ether as described above. The product, 1,18-di-(2,6,6-trimethyl-3-oxo-1-cyclohexen-1-yl) - 3,7,12,16 - tetramethyl - 1,3,5,7,11,13,15,17-octadecaoctaen-9-yne melted at 186–188°; U.V. absorption maxima at 437–439 m$\mu$ (in petroleum ether).

350 g. of 1,18-di-(2,6,6-trimethyl-3-oxo-1-cyclohexen-1-yl)-3,7,12,16-tetramethyl-1,3,5,7,11,13,15,17 - octadecaoctaen-9-yne were suspended in 8 liters of petroleum ether (boiling range 80–110°). 150 g. of lead-poisoned palladium-calcium carbonate catalyst and 15 ml. of quinoline were added and the mixture was hydrogenated in a hydrogen atmosphere at about 1 meter water pressure and a temperature of 60–70°. After about 24 hours, approximately 26 liters of hydrogen were absorbed and the reaction came to a standstill. The brown-black hydrogenation solution was cooled to 20° and filtered, and the residue was rinsed out with 1 liter of petroleum ether. The filter residue was dissolved in the minimum quantity of methylene chloride and thereby the precipitated cis-canthaxanthin was separated from the catalyst. The methylene chloride solution was filtered through an aluminum oxide column which was then washed out with methylene chloride until the filtrate came through virtually colorless. The eluate was concentrated on a water bath to a volume of 2 liters. 1.5 liters of petroleum ether (boiling range 80–110°) were added. The solution was again distilled until all the methylene chloride was separated. The cis-canthaxanthin thus obtained was isomerized to all trans-canthaxanthin by boiling the petroleum ether suspension under reflux for 20 hours, then cooling to about 5°. The all trans-canthaxanthin was filtered under suction and the filter residue was thoroughly washed with petroleum ether (boiling range 40–45°). The crystallizate was dried at 60° under water vacuum. The all trans-canthaxanthin melted at 216–217°; U.V. absorption maxima at 465–467 m$\mu$ (in petroleum ether).

Example 2

A mixture consisting of 5 liters of acetone, 250 g. of 1,18-di-(2,6,6-trimethyl-3-hydroxy-1-cyclohexen - 1 - yl)-3,7,12,16 - tetramethyl - 1,3,5,7,11,13,15,17 - octadecaoctaen-9-yne and 450 g. of aluminum isopropoxide was refluxed for 15 hours, while stirring, under a nitrogen atmosphere. Stirring was continued and the mixture permitted to cool to room temperature, whereby part of the 1,18 - di - (2,6,6 - trimethyl-3-oxo-1-cyclohexen-1-yl)-3,7,12,16 - tetramethyl - 1,3,5,7,11,13,15,17 - octadecaoctaen-9-yne formed precipitated.

The benzene-acetone mother liquors were separated by decantation, washed with 2 portions of a mixture containing 400 ml. of concentrated sulfuric acid, 5 liters of water and 4 kilos of ice, dried over calcium chloride and concentrated to dryness in vacuo.

The decantation residue was dissolved in 2 liters of methylene chloride; the solution was washed with 2 portions of a mixture containing 100 ml. of concentrated sulfuric acid, 1200 ml. of water and 1 kg. of ice, and dried over calcium chloride. The residue gained from the mother liquors was dissolved in the same methylene chloride solution which was then concentrated in vacuo to a volume of about 1 liter. 700 ml. of methanol were added and evaporation was continued until crystallization began. The mixture was cooled for 2 hours in an ice bath and the precipitated crystalline mass was filtered off, washed with methanol and petroleum ether and dried in vacuo at 50°. The product melted at 187–188°; U.V. absorption maximum at 438 m$\mu$ (in petroleum ether); $E_1^1 = 1890$.

Example 3

18.6 g. of 8-(2,6,6-trimethyl-1-cyclohexen - 1 - yl) - 6 - methyl-3,5,7-octatrien-2-one were agitated for 3 hours in an ice bath with 70 ml. of methylene chloride, 4 g. of calcium chloride, 6 g. of sodium bicarbonate and 14 g. of N-bromo-succinimide. 10 ml. of quinoline were added, the reaction mixture was filtered and the methylene chloride evaporated in vacuo. After the addition of a further 10 ml. of quinoline, the mixture was heated for 2 hours on a steam bath under a nitrogen atmosphere, and then poured onto ice. The mixture was acidified by the addition of diluted surfuric acid, extracted with petroleum ether, and the petroleum ether solution was washed with water, sodium bicarbonate solution and again with water. The solvent was then distilled off. There was thus obtained 14.2 g. of a crude product which showed a U.V. absorption maximum at 363 m$\mu$ (in petroleum ether). By filtration through an aluminum oxide column 8 - (2,6,6-trimethyl -1,3 - cyclohexadien - 1 - yl)-6-methyl-3,5,7-octatrien-2-one was obtained as a viscous oil; U.V. absorption maximum at 362 m$\mu$ (in petroleum ether); $E_1^1=1030$.

To a suspension of diacetylene-dimagnesium bromide [prepared from 2.2 g. of diacetylene and ethyl magnesium bromide (produced from 1.95 g. of magnesium)] in 50 ml. of absolute ether was added dropwise, at 10°, a solution of 18 g. of 8-(2,6,6-trimethyl-1-3-cyclohexadien-1-yl)-6-methyl-3,5,7-octatrien-2-one in 80 ml. of absolute ether. The mixture was agitated for 12 hours at room temperature and then poured onto ammonium chloride and ice. The ether layer was separated and washed with water, sodium bicarbonate solution and again with water, and then dried over sodium sulfate. The solvent was then distilled off. There was thus obtained 20 g. of a viscous yellow-brown oil, which consisted essentially of 1,18 - di - (2,6,6 - trimethyl - 1,3-cyclohexadien-1-yl)-3,7,12,16 - tetramethyl - 1,3,5,13,15,17 - octadecahexaen-8,10-diyne-7,12-diol (U.V. absorption maximum at 330 m$\mu$; $E_1^1=493$). It was used without further purification.

Following the procedure described in Example 1 precisely, 50 g. of 1,18 - di-(2,6,-trimethyl-1,3-cyclohexadien-1 - yl) - 3,7,12,16-tetramethyl - 1,3,5,13,15,17-octadecahexaen-8,10-diyn-7,12 - diol were converted successively to 1,18 - di - (2,6,6-trimethyl - 4 - acetoxy-2-cyclohexen-1 - ylidene) - 3,7,12,16 - tetramethyl-2,4,6,12,14,16-octadecahexaen-8-10-diyne, [U.V. absorption maxima at 357, 373 and 420 m$\mu$ (in petroleum ether)], 1,18-di-(2,6,6-trimethyl - 4-hydroxy-2 cyclohexen-1-ylidene)-3,7,12,16-tetramethyl - 2,4,6,12,14,16 - octadecahexaen - 8,10-diyne, 1,18 - di - (2,6,6 - trimethyl - 4 - oxo-2-cyclohexen-1-ylidene) - 3,7,12,16 - tetramethyl - 2,4,6,12,14,16 - octadecahexaen-8,10 diyne [U.V. absorption maxima at 388 and 433 m$\mu$ (in petroleum ether)], 8,9,10,11 - di-cis-rhodoxanthin and all trans-rhodoxathin. The last named compound melted at 215°; U.V. absorption maxima at 520, 487 and 455 m$\mu$ (in petroleum ether).

We claim:

1. A process which comprises reacting 1,18-di-(2,6,6,-trimethyl - 2 - cyclohexen - 1 - ylidene)-3,7,12,16-tetramethyl - 2,4,6,12,16 - octadecahexaen - 9 - yn-8,11-diol with a lower alkanoic acid, hydrolyzing the reaction product with a base, oxidizing the hydrolysis product with aluminum alkoxide and a ketone selected from the group consisting of lower alkyl ketones, alicyclic ketones and aromatic ketones and selectively catalytically hydrogenating to a double bond the triple bond of the oxidation product to obtain canthaxanthin.

2. A process which comprises reacting 1,18,-di-(2,6,6-trimethyl - 2 - cyclohexen - 1 - ylidene)-3,7,12,16-tetramethyl - 2,4,6,12,14,16 - octadecahexaen - 9-yn-8,11-diol with a lower alkanoic acid, selectively catalytically hydrogenating to a double bond the triple bond of the reaction product, hydrolyzing the hydrogenation product with a base and oxidizing the hydrolysis product with aluminum alkoxide and a ketone selected from the group consisting of lower alkyl ketones, alicyclic ketones and aromatic ketones to obtain canthaxanthin.

3. A process which comprises reacting 1,18-di-(2,6,6-trimethyl - 2 - cyclohexen - 1 - ylidene)-3,7,12,16-tetramethyl - 2,4,6,12,14,16 - octadecahexaen - 9 - yn-8,11-diol with a lower alkanoic acid, hydrolyzing the reaction product with a base, selectively catalytically hydrogenating to a double bond the triple bond of the reaction product and oxidizing the hydrogenation product with aluminum alkoxide and a ketone selected from the group consisting of lower alkly ketones, alicyclic ketones and aromatic ketones to obtain canthaxanthin.

4. A process which comprises reacting 1,18-di-(2,6,6-trimethy - 2 - cyclohexen - 1 - ylidene)-3,7,12,16-tetramethyl - 2,4,6,12,14,16 - octadecahexaen - 9-yn-8,11-diol with acetic acid, hydrolyzing the reaction product with potassium hydroxide, oxidizing the hydrolysis product with aluminum isopropoxide and acetone and selectively hydrogenating to a double bond the triple bond of the oxidation product in the presence of lead-palladium catalyst and quinoline to obtain canthaxanthin.

5. A process which comprises reacting 1,18-di-(2,6,6-trimethyl - 2 - cyclohexen - 1 - ylidene)-3,7,12,16-tetramethyl - 2,4,6,12,14,16 - octadecahexaen - 9-yn-8,11-diol with a lower alkanoic acid to obtain 1,18 - di-(2,6,6-trimethyl - 3 - lower alkanoyloxy-1-cyclohexen-yl)-3,7,12,16-tetramethyl-1,3,5,7,11,13,15,17-octadecaoctaen-9-yne.

6. A process which comprises reacting 1,18-di-(2,6,6-trimethyl - 2 - cyclohexen - 1 - ylidene)-3,7,12,16-tetramethyl - 2,4,6,12,14,16 - octadecahexaen - 9-yn-8,11-diol with a lower alkanoic acid to produce 1,18-di-(2,6,6-trimethyl - 3 - lower alkanoyloxy - 1 - - cyclohexen-1-yl)-3,7,12,16 - tetramethyl - 1,3,5,7,11,13,15,17-octadecaoctaen-9-yne and hydrolyzing said last named product with a base to obtain 1,18 - di-(2,6,6,-trimethyl-3-hydroxy-1-cyclohexen - 1 - yl)-3,7,12,16-tetramethyl - 1,3,5,7,11,13, 15,17-octadecaoctaen - 9-yne.

7. A process which comprises reacting 1,18-di-(2,6,6-trimethyl - 1,3 - cyclohexadien - 1 - yl)-3,7,12,16-tetramethyl - 1,3,5,13,15,17 - octadecahexaen - 8,10-diyn-7,12-diol with a lower alkanoic acid, hydrolyzing with a base the reaction product, oxidizing the hydrolysis product with aluminum alkoxide and a ketone selected from the group consisting of lower alkyl ketones, alicyclic ketones and aromatic ketones and selectively hydrogenating to 2 double bonds the triple bonds of the oxidation product to obtain rhodoxanthin.

8. A process which comprises reacting 1,18-di-(2,6,6-trimethyl - 1,3 - cyclohexadien - 1 - yl)-3,7,12,16-tetramethyl - 1,3,5,13,15,17 - octadecahexaen - 8,10-diyn-7,12-diol with a lower alkanoic acid, selectively hydrogenating to 2 double bonds the triple bonds of the reaction product, hydrolyzing the hydrogenation product with a base and oxidizing the hydrolysis product with aluminum alkoxide and a ketone selected from the group consisting of lower alkyl ketones, alicyclic ketones and aromatic ketones to obtain rhodoxanthin.

9. A process which comprises reacting 1,18-di(2,6,6-trimethyl-1,3-cyclohexadien-1-yl)-3,7,12,16-tetramethyl - 1, 3,5,13,15,17 - octadecahexaen-8,10-diyn-7,12 - diol with a lower alkanoic acid, hydrolyzing with a base the reaction product, selectively hydrogenating to 2 double bonds the triple bonds of the hydrolysis product and oxidizing the hydrogenation product with aluminum alkoxide and a ketone selected from the group consisting of lower alkyl ketones, alicyclic ketones and aromatic ketones to obtain rhodoxanthin.

10. A process which comprises reacting 1,18-di-(2,6,6-trimethyl-1,3-cyclohexadien-1-yl)-3,7,12,16 - tetramethyl-1,3,5,13,15,17-octadecahexaen-8,10-diyn - 7,12-diol with acetic acid, hydrolyzing the reaction product with potassium hydroxide, oxidizing the hydrolysis product with aluminum isopropoxide and acetone and selectively hydrogenating to 2 double bonds the triple bonds of the oxidation product in the presence of lead-palladium catalyst and quinoline to obtain rhodoxanthin.

11. A process which comprises reacting 1,18-di-(2,6,6-trimethyl-1,3-cyclohexadien-1-yl) - 3,7,12,16 - tetramethyl 1,3,5,13,15,17-octadecahexaen-8,10-diyn-7,12-diol with a lower alkanoic acid to produce 1,18-di-(2,6,6-trimethyl-4-lower alkanoyloxy-2-cyclohexen-1-ylidene) - 3,7,12,16-tetramethyl-2,4,6,12,14,16-octadecahexaen-8,10-diyne.

12. 1,18-di - (2,6,6-trimethyl-4-lower alkanoyloxy-2-cyclohexen - 1 - ylidene)-3,7,12,16-tetramethyl-2,4,6,12,14,-16-octadecahexaen-8,10-diyne.

13. 1,18-di - (2,6,6-trimethyl-4-acetoxy-2-cyclohexen-1-ylidene)-3,7,12,16-tetramethyl-2,4,6,12,14,16 - octadecahexaen-8,10-diyne.

14. 1,18-di - (2,6,6-trimethyl-4-hydroxy-2-cyclohexen-1-ylidene)-3,7,12,16-tetramethyl-2,4,6,12,14,16 - octadecahexaen-8,10-diyne.

15. 1,18-di-(2,6,6 - trimethyl - 4 - oxo-2-cyclohexen-1-ylidene)-3,7,12,16-tetramethyl - 2,4,6,12,14,16 - octadecahexaen-8,10-diyne.

References Cited in the file of this patent
UNITED STATES PATENTS

| | | |
|---|---|---|
| 2,845,440 | Isler et al. | July 29, 1958 |

FOREIGN PATENTS

| | | |
|---|---|---|
| 790,614 | Great Britain | Feb. 12, 1958 |
| 790,615 | Great Britain | Feb. 12, 1958 |

OTHER REFERENCES

Adams et al.: "Organic Reactions," vol. 6, 1951, pages 208–272.

De Wolfe et al.: Chemical Reviews, 56, 755–759 and 762–827.